(12) United States Patent
Sagayama et al.

(10) Patent No.: US 9,827,959 B2
(45) Date of Patent: Nov. 28, 2017

(54) ABS HYDRAULIC UNIT

(71) Applicant: Robert Bosch GmbH, Stuttgart (DE)

(72) Inventors: Kosaku Sagayama, Kanagawa (JP);
Hiroaki Atsushi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 14/404,825

(22) PCT Filed: Feb. 20, 2013

(86) PCT No.: PCT/JP2013/054114
§ 371 (c)(1),
(2) Date: Mar. 13, 2015

(87) PCT Pub. No.: WO2013/179698
PCT Pub. Date: Dec. 5, 2013

(65) Prior Publication Data
US 2015/0191161 A1 Jul. 9, 2015

(30) Foreign Application Priority Data

May 31, 2012 (JP) .................................. 2012-124107

(51) Int. Cl.
*B60T 8/36* (2006.01)
*B62L 3/02* (2006.01)
*B62K 23/06* (2006.01)

(52) U.S. Cl.
CPC ............ *B60T 8/3685* (2013.01); *B62K 23/06* (2013.01); *B62L 3/023* (2013.01)

(58) Field of Classification Search
CPC . B60T 8/409; B60T 8/261; B60T 8/34; B60T 8/176; B60T 8/4402; B60T 13/165;
(Continued)

(56) References Cited

U.S. PATENT DOCUMENTS 4,421,359 A * 12/1983 Hayashi ................ B60T 8/3225
188/344
7,350,881 B2 * 4/2008 Asahi .................... B60T 8/3685
180/232
(Continued)

FOREIGN PATENT DOCUMENTS

CN     2546319      4/2003
CN     1448312      10/2003
(Continued)

OTHER PUBLICATIONS

English machined translation of JP-2010-254208.*
(Continued)

*Primary Examiner* — Robert A Siconolfi
*Assistant Examiner* — San Aung
(74) *Attorney, Agent, or Firm* — Michael Best & Friedrich LLP

(57) ABSTRACT

To improve the degree of freedom with which an ABS hydraulic unit is attached to a handlebar, an ABS hydraulic unit includes a main housing that has at least part of a hydraulic circuit formed inside and is equipped with a mounting portion for mounting a brake lever and an attachment portion having at least part of a side surface of a through hole formed along a first direction, the through hole being for attaching the ABS hydraulic unit to a handlebar. The ABS hydraulic unit also includes a master cylinder that has a piston portion that moves in conjunction with the brake lever, the master cylinder being for increasing, with the movement of the piston portion, the pressure of brake fluid inside the hydraulic circuit. A piston insertion hole that extends in the moving direction of the piston portion and is for inserting the master cylinder is formed in the main housing along a second direction that intersects, but is not orthogonal to, the first direction.

10 Claims, 5 Drawing Sheets

(58) Field of Classification Search
CPC ...... B60T 13/142; B60T 17/04; B60T 17/043;
B60T 7/10; B60T 8/3685; B60T 8/3225;
B60T 8/368; B60T 8/4031; B60T 8/4081;
B62L 3/02; B62L 3/023; F04B 9/04;
B62K 23/06; B62K 19/38
USPC ............... 303/137, 3, 9.64, 64, 119.3, 113.4,
303/DIG. 10
See application file for complete search history.

(56) References Cited

U.S. PATENT DOCUMENTS

| | | | | |
|---|---|---|---|---|
| 8,287,053 | B2* | 10/2012 | Tahara | B60T 7/042 |
| | | | | 180/219 |
| 8,887,859 | B2* | 11/2014 | Matsushima | B62L 3/023 |
| | | | | 180/219 |
| 2007/0051104 | A1* | 3/2007 | Kawai | B62L 3/023 |
| | | | | 60/533 |
| 2007/0278853 | A1* | 12/2007 | Bayer | B60T 8/3225 |
| | | | | 303/9.64 |

FOREIGN PATENT DOCUMENTS

| | | |
|---|---|---|
| JP | 9216548 | 8/1997 |
| JP | 2009234502 | 10/2009 |
| JP | 2010254208 | 11/2010 |
| JP | 4783391 | 9/2011 |
| WO | 02058988 A1 | 8/2002 |

OTHER PUBLICATIONS

International Search Report for Application No. PCT/JP2013/054114 dated Apr. 9, 2013 (English Translation, 1 page).

* cited by examiner (A)

(B)

ABS HYDRAULIC UNIT

BACKGROUND OF THE INVENTION

The present invention relates to an ABS hydraulic unit that performs antilock brake control.

ABS (Antilock Brake System) hydraulic units for motorcycles that control the pressure of brake fluid supplied to front wheel brakes and perform antilock brake control are known. Furthermore, technologies for attaching the ABS hydraulic units to handlebars are known (e.g., JP-A-2010-254208). These technologies have advantages over a configuration where the ABS hydraulic unit is attached under the seat, such as it is easy to attach and detach the ABS hydraulic unit, the ABS hydraulic unit is less susceptible to thermal damage, and the number of parts and the number of tubes are small.

SUMMARY OF INVENTION

However, the technology of JP-A-2010-254208 leaves room for improvement. For example, the area around the handlebar to which gauges and so forth are attached has many space limitations, so depending on the type and specifications of the motorcycle, sometimes space for disposing the ABS hydraulic unit cannot be ensured around the handlebar. For this reason, improving the degree of freedom with which the ABS hydraulic unit is attached to the handlebar has been desired.

The present invention has been made in order to solve at least part of the aforementioned problem and can, for example, be realized as the following aspects.

One aspect of the present invention is provided as an ABS hydraulic unit that performs antilock brake control of a motorcycle. The ABS hydraulic unit comprises: a main housing that has at least part of a hydraulic circuit for controlling the pressure of brake fluid formed inside and is equipped with a mounting portion for mounting a brake lever of the motorcycle and an attachment portion having at least part of a side surface of a through hole formed along a first direction, the through hole being for attaching the ABS hydraulic unit to a handlebar of the motorcycle; and a master cylinder that has a piston portion that moves in conjunction with the brake lever, the master cylinder being for increasing, with the movement of the piston portion, the pressure of the brake fluid inside the hydraulic circuit. In this ABS hydraulic unit, a piston insertion hole extending in the moving direction of the piston portion is formed in the main housing along a second direction that intersects, but is not orthogonal to, the first direction.

According to this ABS hydraulic unit, the piston insertion hole is formed along a direction that intersects, but does is not orthogonal to, the handlebar in a state in which the ABS hydraulic unit is attached to the handlebar. Consequently, the width of the ABS hydraulic unit in the direction parallel to the handlebar can be made smaller than a case where the piston insertion hole is formed along a direction parallel to the handlebar. As a result, the degree of freedom with which the ABS hydraulic unit is attached to the handlebar is improved, and compatibility with a variety of motorcycles is improved.

In the ABS hydraulic unit, an inside hydraulic circuit of the hydraulic circuit that is formed inside the main housing may include a control valve for performing the antilock brake control. The control valve may be disposed on a direction-of-gravity lower side or a side of the main housing in a state in which the ABS hydraulic unit is attached to the handlebar. According to this configuration, air inside the control valve can be easily guided to the outside when filling the hydraulic circuit with the brake fluid.

In the ABS hydraulic unit, the attachment portion may be configured by one. According to this configuration, the configuration of the ABS hydraulic unit can be made simple and compact. In this configuration, the ABS hydraulic unit and the handlebar inserted into the through hole are fixed in one place.

The ABS hydraulic unit may further comprise: an ECU that controls the actions of the ABS hydraulic unit and is mounted to the main housing; and a power supply connector that is connected to the ECU and is for connecting to a power supply for the ECU. The power supply connector may be disposed on the side opposite the mounting portion in the first direction. A battery serving as the power supply for the motorcycle is usually installed on the inside of the motorcycle, such as under the seat or in the side cowl. According to this configuration, the power supply connector is disposed on the inside of the motorcycle, that is, on the side near the power supply, so the length of the cable interconnecting the power supply connector and the power supply can be shortened. Consequently, the manufacturing cost can be reduced. Furthermore, it becomes easy to run the cable.

In the ABS hydraulic unit, the hydraulic circuit may be configured by one channel. According to this configuration, the configuration of the ABS hydraulic unit can be made simple. Furthermore, the ABS hydraulic unit can be reduced in size.

The ABS hydraulic unit may further comprise a reservoir tank for the master cylinder. A connection port for connecting to the reservoir tank may be formed in a side of the main housing in a state in which the ABS hydraulic unit is attached to the handlebar. The reservoir tank may be disposed on a side of the mounting portion in the first direction relative to the main housing. According to this configuration, the reservoir tank is positioned between the handlebar (grip) and the brake lever when the ABS hydraulic unit has been attached to the handlebar. For this reason, the width of the ABS hydraulic unit on the inside of the brake lever can be made smaller. That is, it is difficult for installation space for gauges positioned on the inside of the brake lever to be compressed by the ABS hydraulic unit. Consequently, the degree of freedom with which the ABS hydraulic unit is attached to the handlebar and compatibility with a variety of motorcycles are improved even more.

In the ABS hydraulic unit, the attachment portion may be equipped with a groove portion formed along the first direction as the side surface of the through hole. The through hole may be formed by mounting a bracket separate from the main housing in a position opposing the groove portion of the attachment portion. According to this configuration, the configuration of the main housing can be simplified.

The ABS hydraulic unit may further comprise the brake lever mounted to the mounting portion.

DETAILED DESCRIPTION

A. Working Example

Figure 1:
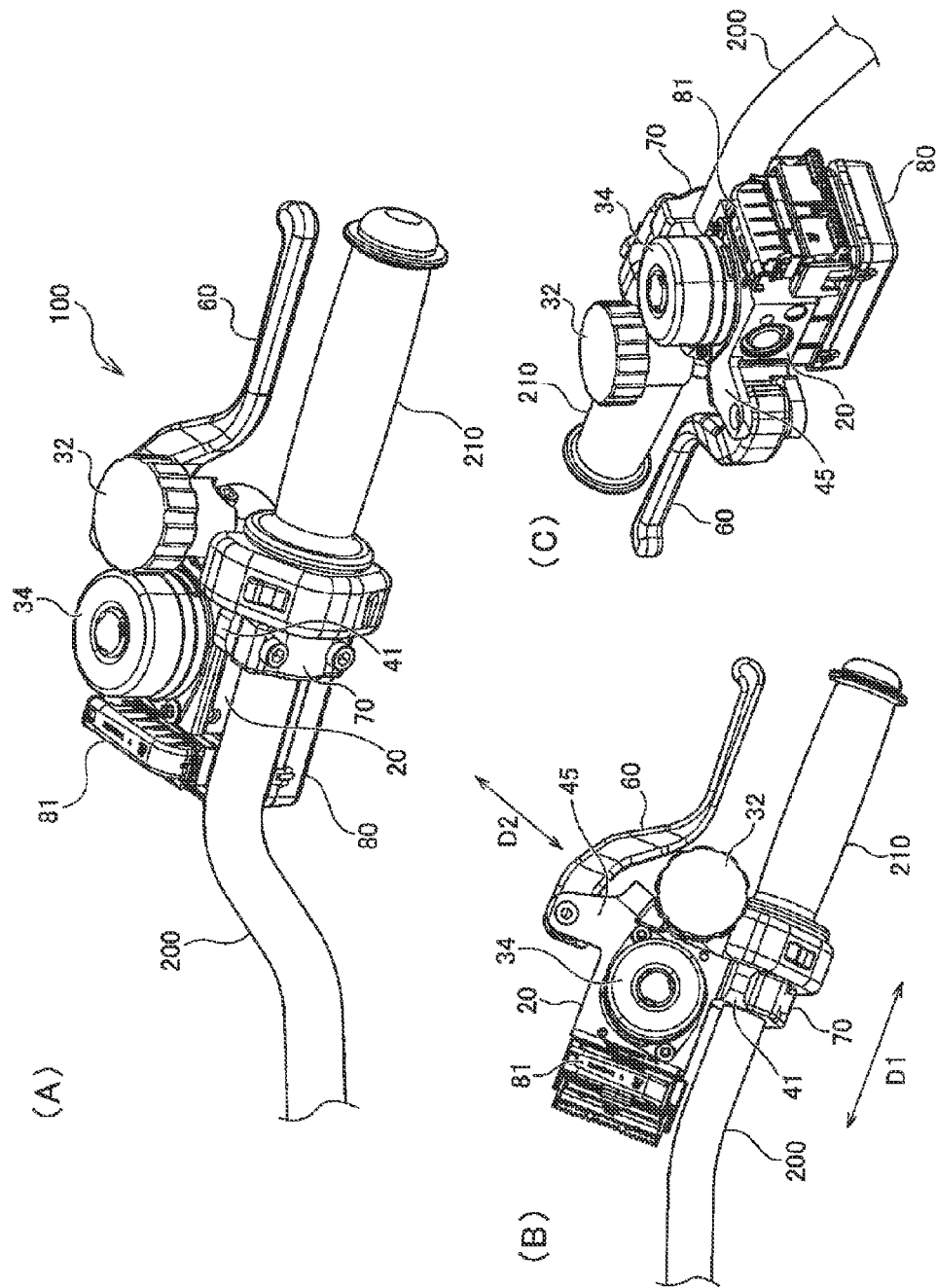
FIG. 1 is explanatory views showing a state in which an ABS hydraulic unit is attached to a handlebar of a motorcycle.

FIG. 1 shows a state in which an ABS hydraulic unit 100 (hereinafter also simply called "the hydraulic unit 100") serving as a working example of the present invention is attached to a handlebar 200 of a motorcycle. The hydraulic unit 100 performs antilock brake control in regard to a front wheel of the motorcycle. The motorcycle is not limited to a vehicle equipped with one front wheel and one rear wheel and may also be a vehicle equipped with one front wheel and two rear wheels.

FIG. 1(A) shows a state in which the hydraulic unit 100 is seen from the upper side and the rear side of the motorcycle. FIG. 1(B) shows a state in which the hydraulic unit 100 is seen from directly above. FIG. 1(C) shows a state in which the hydraulic unit 100 is seen from the upper side and the front side of the motorcycle. The hydraulic unit 100 is attached on the front side of the motorcycle to the handlebar 200. The hydraulic unit 100 is equipped with a main housing 20, a brake lever 60, a bracket 70, and an ECU 80. Furthermore, the hydraulic unit 100 is equipped with a motor 34, a reservoir tank 32, and a power supply connector 81.

A hydraulic circuit 30 for brake fluid to flow through is formed inside the main housing 20. The hydraulic circuit 30 is configured from flow paths that are formed as a result of the main housing 20 being cut and valves that are inserted into spaces formed inside the main housing 20. The details of the hydraulic circuit 30 will be described later. In the present working example, the main housing 20 is formed of a metal such as aluminum in the shape of a substantial cuboid. The motor 34 is mounted to the upper surface of the main housing 20, that is, the surface on the side opposite the direction of gravity in a state in which the hydraulic unit 100 is mounted to the handlebar 200.

The brake lever 60 is mounted to the main housing 20 in such a way as to oppose, in a substantially parallel manner, a grip 210 disposed on the end portion of the handlebar 200. The bracket 70 is configured to be attachable to and detachable from an attachment portion 41 (details described later) of the main housing 20. The hydraulic unit 100 is attached and fixed to the handlebar 200 as a result of the bracket 70 being mounted to the main housing 20 by bolts in a state in which the handlebar 200 is sandwiched between the bracket 70 and the attachment portion 41 of the main housing 20.

The ECU 80 controls the actions of the hydraulic unit 100. More specifically, the ECU 80 electrically controls the motor 34, an inlet valve 35, and a pressure reducing valve 37 described later. The ECU 80 is attached to the lower surface of the main housing 20. In the present working example, a casing of the ECU 80 is formed of a resin material.

The power supply connector 81 for connecting to a battery (not shown in the drawings) serving as a power supply for the ECU 80 is connected to the ECU 80. In a state in which the hydraulic unit 100 is attached to the handlebar 200, the power supply connector 81 is disposed on the side of the attached section opposite the side where the brake lever 60 is mounted (the side of a mounting portion 45 described later) in the direction in which the handlebar 200 extends (hereinafter also called a first direction D1). The battery is ordinarily installed on the inside of the motorcycle, such as under the seat of the motorcycle or in the side cowl.

According to this disposition of the power supply connector 81, the power supply connector 81 is disposed on the inside of the motorcycle, that is, on the side near the battery. For this reason, the length of the cable interconnecting the power supply connector 81 and the battery can be shortened. As a result, the manufacturing cost of the motorcycle can be reduced. Furthermore, it becomes easy to run the cable.

The motor 34 is a DC motor installed as a drive source for a hydraulic pump 33 described later. The motor 34 is attached to the upper surface of the main housing 20.

The reservoir tank 32 is disposed adjacent to the motor 34 on the upper side of the hydraulic unit 100 (the side opposite the ECU 80). Furthermore, the reservoir tank 32 is disposed on the side where the brake lever 60 is mounted (the grip 210 side) in the first direction D1 relative to the main housing 20. This installation position of the reservoir tank 32 is between the grip 210 and the brake lever 60. According to this disposition, the width of the hydraulic unit 100 on the inside of the brake lever 60 can be made smaller. That is, it is difficult for installation space for gauges positioned on the inside of the brake lever 60 to be compressed by the hydraulic unit 100.

Figure 2:
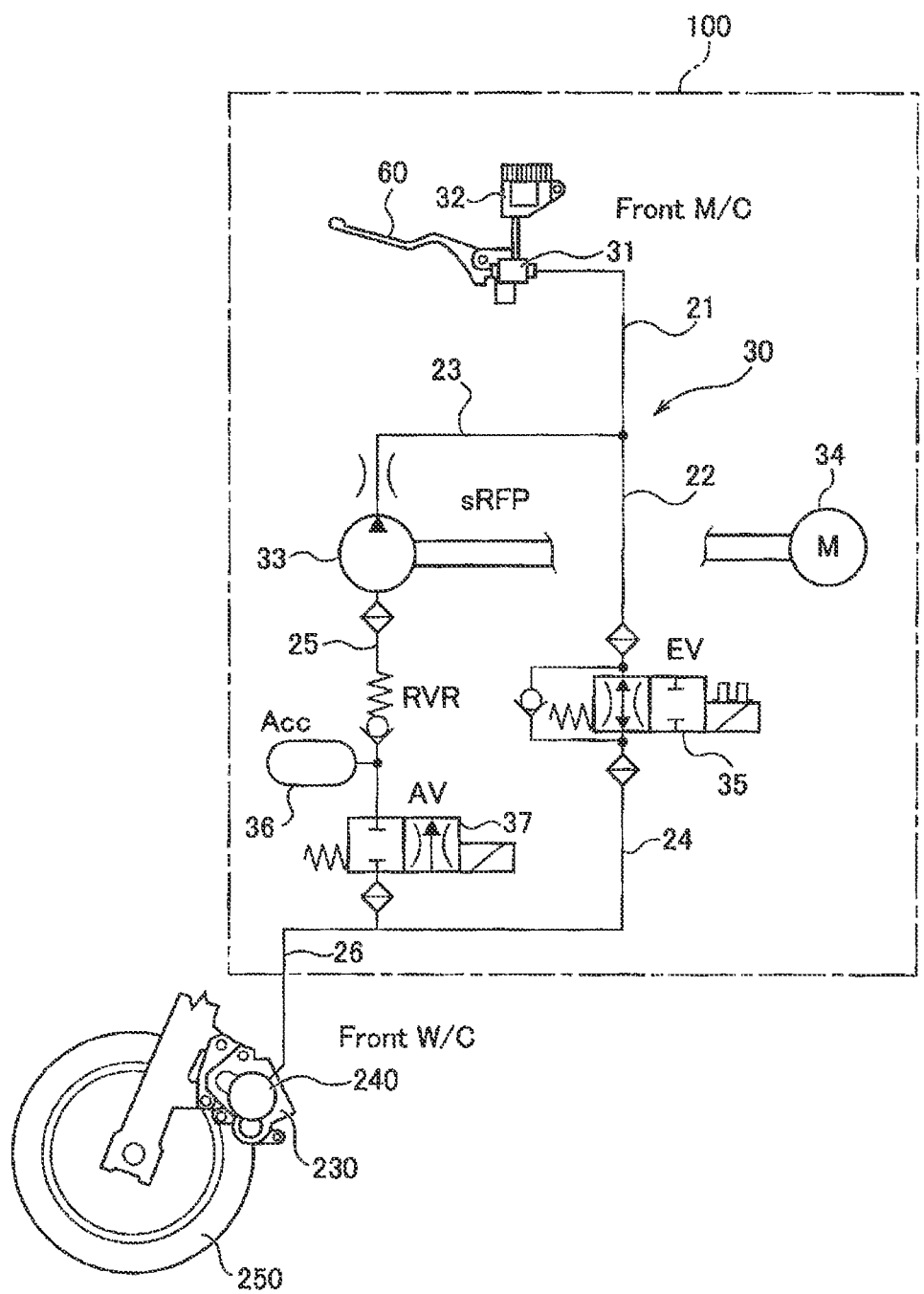
FIG. 2 is an explanatory diagram showing the configuration of a hydraulic circuit.

FIG. 2 shows the configuration of the hydraulic circuit 30. The hydraulic circuit 30 is equipped with a master cylinder (M/C) 31, the hydraulic pump 33, the inlet valve (EV) 35, an accumulator 36, the pressure reducing valve (AV) 37, and conduits 21 to 26. The hydraulic circuit 30 is filled with brake fluid.

The master cylinder 31 is equipped with a piston portion (not shown in the drawings) that moves in conjunction with the brake lever 60 operated by a rider. The master cylinder 31 has a piston insertion hole 43 (details described later) extending in the moving direction of the piston portion, and the master cylinder 31 increases, with the movement of the piston portion inserted into the piston insertion hole 43, the pressure of the brake fluid inside the hydraulic circuit 30. The master cylinder 31 is connected to the conduit 21.

The conduit 21 branches into the conduit 22 and the conduit 23. The conduit 22 is connected to the inlet valve 35 via a filter. The inlet valve 35 is an electromagnetic valve. The inlet valve 35 is always open during normal times, that is, in a state in which antilock brake control is not performed. The inlet valve 35 is connected to the conduit 24 via a filter. Between these two filters, a check valve is connected in parallel with the inlet valve 35.

The conduit 23 branching from the conduit 21 is connected via a diaphragm to a discharge port of the hydraulic pump 33. The hydraulic pump 33 is a plunger pump. The hydraulic pump 33 is driven by the motor 34. A suction port of the hydraulic pump 33 is connected to the conduit 25 via a filter. A check valve is connected to the conduit 25, and the pressure reducing valve 37 is connected to the conduit 25 further down from the check valve. The pressure reducing valve 37 is an electromagnetic valve. The pressure reducing valve 37 is always closed during normal times. Between the check valve and the pressure valve 37 on the conduit 25, the accumulator 36 is connected in parallel with the pressure reducing valve 37.

The pressure reducing valve 37 is connected to the conduit 24 via a filter. The conduit 24 is connected to the conduit 26. The conduit 26 is connected to a wheel cylinder (W/C) 240. The wheel cylinder 240 applies braking force to a front wheel brake 230 of a front wheel 250 of the motorcycle.

In the present working example, the paths of the brake fluid from the master cylinder 31 to the middle of the conduit 26 are all formed inside the main housing 20. However, some of these paths may also be formed outside the main housing 20.

As is apparent from the above description, the hydraulic circuit 30 is configured by one channel. According to this configuration, the configuration of the hydraulic unit 100 can be simplified. Furthermore, the hydraulic unit 100 can be reduced in size.

The hydraulic unit 100 controls the pressure of the brake fluid supplied to the wheel cylinder 240 when the rider has operated the brake lever 60 and performs antilock brake control so that the front wheel 250 does not lock up. The actions during the antilock brake control are, for example, performed as follows.

The ECU 80 initiates antilock brake control when a lock-up tendency is detected by a wheel speed sensor (not shown in the drawings) when the brake lever 60 is operated by the rider. The ECU 80 first performs a pressure decrease action. In the pressure decrease action, the ECU 80 closes the inlet valve 35 and opens the pressure reducing valve 37 to let the hydraulic pressure in the wheel cylinder 240 escape to the accumulator 36. Because of this, the hydraulic pressure in the wheel cylinder 240 drops and a lock-up of the front wheel 250 is avoided.

Next, the ECU 80 performs the pressure decrease action and a pressure increase action plural times. In the pressure increase action, the hydraulic pressure in the wheel cylinder 240 is repeatedly increased and held at predetermined intervals. Because of this, the hydraulic pressure in the wheel cylinder 240 rises in a stepwise manner. During the times when the pressure is increased, the ECU 80 opens the inlet valve 35, closes the pressure reducing valve 37, and drives the hydraulic pump 33. Because of this, the brake fluid is sent from the accumulator 36 via the hydraulic pump 33 and the inlet valve 35 to the wheel cylinder 240. On the other hand, during the times when the pressure is held, the ECU 80 closes both the inlet valve 35 and the pressure reducing valve 37. Because of this, the hydraulic pressure in the wheel cylinder 240 is held at a constant.

Figure 3:
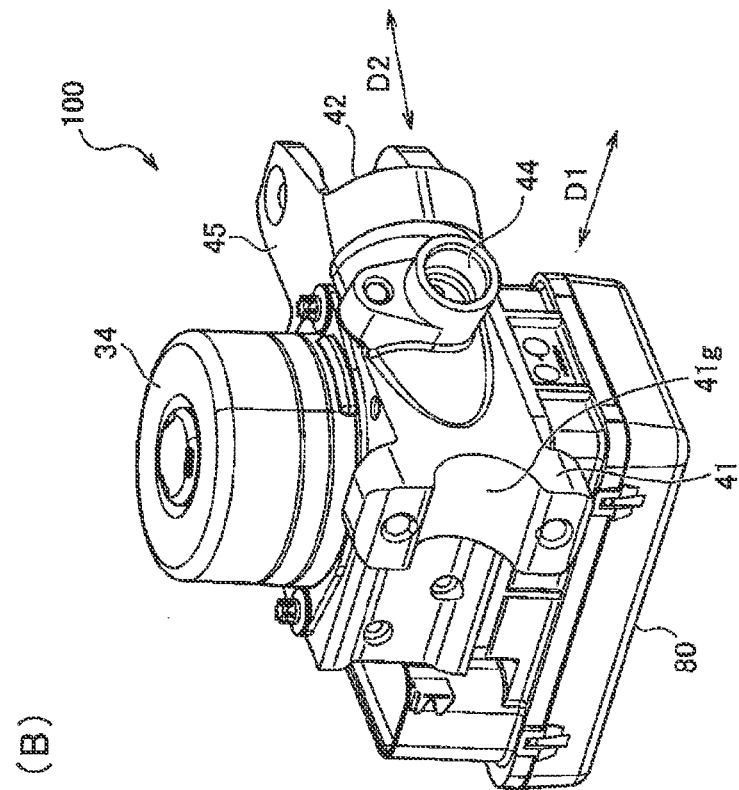
FIG. 3 is perspective views showing the outer shape of a main housing.
Figure 3:
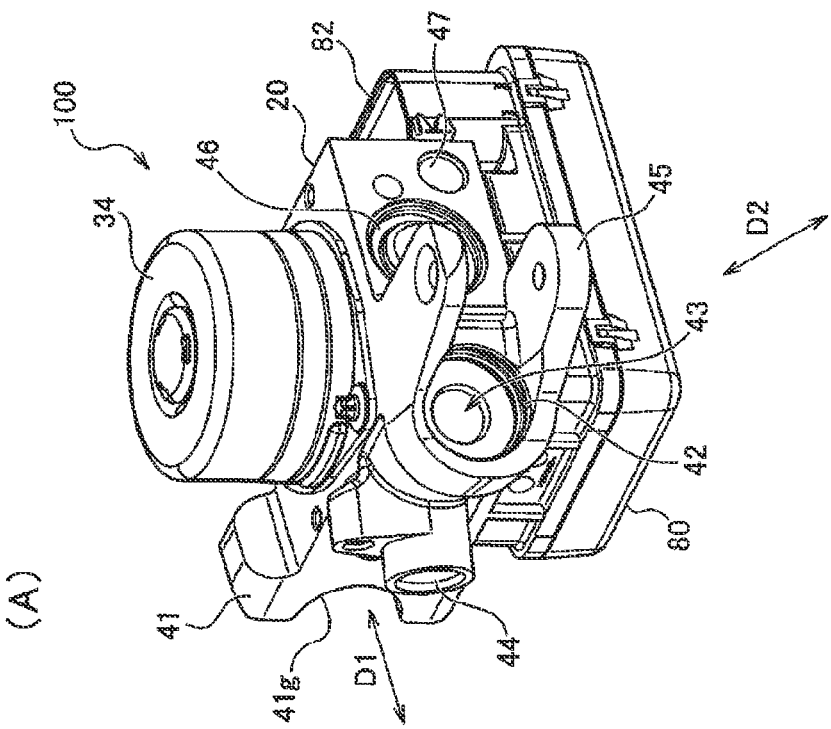

FIG. 3 shows the outer shape of the main housing 20. FIG. 3 shows the main housing 20 in a state before the elements configuring the hydraulic circuit 30 are inserted inside the main housing 20. FIG. 3(B) shows a state in which the hydraulic unit 100 shown in FIG. 3(A) has been rotated 90° in the horizontal direction.

As shown in FIG. 3(A) and FIG. 3(B), the main housing 20 is equipped with the attachment portion 41 and the mounting portion 45. The attachment portion 41 has a groove portion 41g recessed in a circular arc shape. Likewise, the bracket 70 has a shape recessed in a circular arc shape. When the bracket 70 is mounted to the attachment portion 41 in such a way that the groove portion 41g and the recessed portion of the bracket 70 oppose one another, a through hole along the first direction D1 is formed by the groove portion 41g and the recessed portion of the bracket 70. The handlebar 200 becomes inserted through the through hole when the hydraulic unit 100 is mounted to the handlebar 200.

The mounting portion 45 is a part for mounting the brake lever 60. The mounting portion 45 has two parts opposing one another in the up and down direction. The brake lever 60 is inserted between these two parts and fastened with bolts, whereby the brake lever 60 is mounted to the main housing 20 in such a way that the brake lever 60 can rotate in a predetermined range in the horizontal direction about the bolts.

Furthermore, a snap ring attachment hole 42, a reservoir connection port 44, an accumulator-use opening 46, and a wheel cylinder connection port 47 are formed in the main housing 20. The snap ring attachment hole 42, the reservoir connection port 44, the accumulator-use opening 46, and the wheel cylinder connection port 47 are all formed on the sides in a state in which the hydraulic unit 100 is attached to the handlebar 200, that is, in surfaces intersecting the surface to which the motor 34 is mounted.

The snap ring attachment hole 42 is a hole for attaching a snap ring. The snap ring prevents the piston portion inserted into the piston insertion hole 43 described later from coming out of the piston insertion hole 43. The snap ring attachment hole 42 is formed in the neighborhood of the mounting portion 45. Furthermore, the snap ring attachment hole 42 is communicated with the piston insertion hole 43 for inserting the piston portion. The piston insertion hole 43 is formed in the horizontal direction. Furthermore, the piston insertion hole 43 is formed along a second direction D2. The second direction D2 is a direction that intersects, but is not orthogonal to, the first direction D1. In the present working example, the angle of intersection between the first direction D1 and the second direction D2 is about 70°.

The reservoir connection port 44 is a connection port for connecting the reservoir tank 32. The reservoir connection port 44 is formed between the attachment portion 41 and the snap ring attachment hole 42. As mentioned above, the reservoir connection port 44 is formed on the side of the main housing 20. Because of this, the disposition of the reservoir tank 32 described above—that is, the disposition on the side of the mounting portion 45 in the first direction D1 relative to the main housing 20—becomes possible.

The accumulator-use opening 46 is an opening for inserting a member configuring the accumulator 36. The wheel cylinder connection port 47 is an opening for connecting to the conduit on the wheel cylinder 240 side, and more specifically the part of the conduit 26 on the wheel cylinder 240 side. The accumulator-use opening 46 and the wheel cylinder connection port 47 are formed in the same side surface of the main housing 20. The side surface in which the accumulator-use opening 46 and the wheel cylinder connection port 47 are formed and the side surface in which the reservoir connection port 44 is formed are adjacent to one another, with the snap ring attachment hole 42 being interposed in between.

Figure 4:
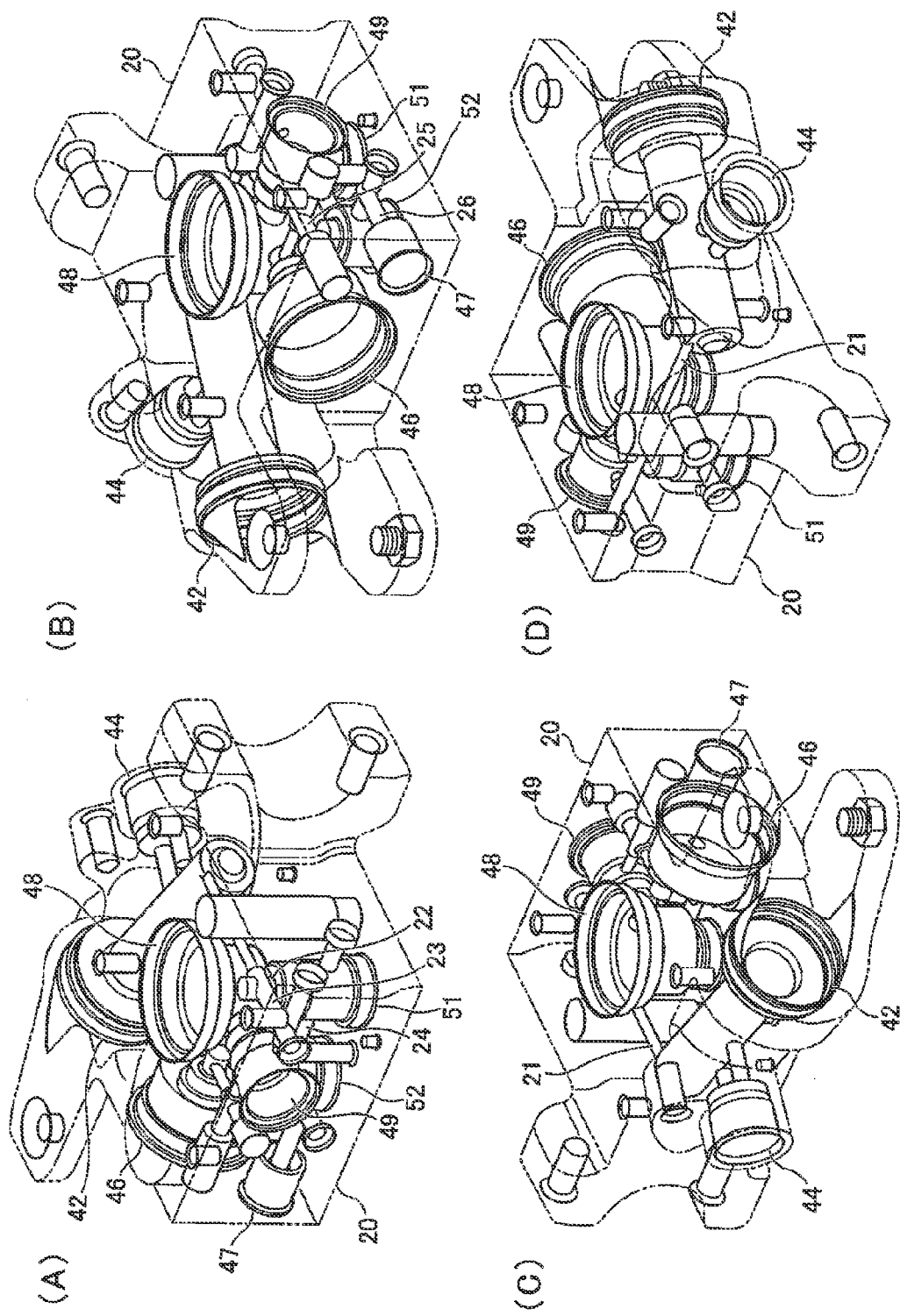
FIG. 4 is transparent views showing the internal configuration of the main housing.

FIG. 4 is transparent views showing the internal configuration of the main housing 20. FIG. 4 shows a state before the motor 34 is mounted to the main housing 20. FIG. 4(B) to FIG. 4(D) show states in which the main housing 20 shown in FIG. 4(A) has been rotated 90°, 180°, and 270°, respectively, in the horizontal direction. Only configurations that have not been described using FIG. 3 will be described below.

As shown in FIG. 4(A) to FIG. 4(D), a motor mounting port 48, a pump mounting port 49, an inlet valve mounting port 51, and a pressure reducing valve mounting port 52 are formed in the main housing 20. The motor mounting port 48 is an opening for mounting the motor 34. The pump mounting port 49 is an opening for mounting the hydraulic pump 33. The inlet valve mounting port 51 is an opening for mounting the inlet valve 35. The pressure reducing valve mounting port 52 is an opening for mounting the pressure reducing valve 37.

The motor mounting port 48 is formed in the upper surface of the main housing 20. The pump mounting port 49 is formed on the side of the main housing 20. The inlet valve mounting port 51 and the pressure reducing valve mounting port 52 are formed in the lower surface of the main housing 20, that is, the surface on the direction-of-gravity lower side. According to this disposition of the inlet valve mounting port 51 and the pressure reducing valve mounting port 52, air retained beforehand in the inlet valve 35 and the pressure reducing valve 37 can be easily guided to the outside when filling the hydraulic circuit 30 with the brake fluid at the time of manufacture of the hydraulic unit 100. In other words, during the work of filling with the brake fluid, it is not necessary to purge the air from the inside of the hydraulic circuit 30, and the number of man-hours required for manufacturing can be reduced.

In the present working example, the conduit heading from the inlet valve 35 to the wheel cylinder connection port 47 and the conduit heading from the pressure reducing valve 37 to the wheel cylinder connection port 47 are made common (see FIG. 2). Specifically, as shown in FIG. 4(A) and FIG. 4(B), when seen from the inlet valve 35 side, the conduit 24 is communicated with the lower side of a hole communicated with the pressure reducing valve mounting port 52 (a hole for inserting a member configuring the pressure reducing valve 37) and is connected further down to the conduit 26. More specifically, the hole is formed in such a way that its diameter becomes smaller heading upward. The upper side of the hole is closed by the valve element of the pressure reducing valve 37 in a state in which the pressure reducing valve 37 is closed. Meanwhile, on the lower side of the hole, a space is formed on the outer periphery of the member configuring the pressure reducing valve 37. This space is utilized as part of the conduit 24 so that the aforementioned two conduits are made common. According to this configuration, the paths of the hydraulic circuit 30 can be simplified, and the main housing 20 can be reduced in size.

According to the hydraulic unit 100 described above, the piston insertion hole 43 for inserting the piston portion of the master cylinder 31 is formed along the second direction D2, which is a direction intersecting the handlebar 200, in a state in which the hydraulic unit 100 is attached to the handlebar 200. Consequently, the width of the hydraulic unit 100 in the first direction D1 can be made smaller than in a case where the second direction D2 is formed along a direction parallel to the handlebar 200 (the first direction D1). As a result, the degree of freedom with which the hydraulic unit 100 is attached to the handlebar 200 is improved, and compatibility with a variety of motorcycles is improved. Furthermore, the direction of the piston insertion hole 43 is a direction that is not orthogonal to the first direction D1, so the lever ratio can be suitably ensured. In order to balance the point of ensuring the lever ratio and the point of making the width of the hydraulic unit 100 in the first direction D1 smaller, it is preferred that the angle of intersection between the first direction D1 and the second direction D2 be equal to or greater than 60° and equal to or less than 80°.

Furthermore, in the hydraulic unit 100, the attachment portion 41 is configured by one. Because of this, the hydraulic unit 100 and the handlebar 200 become fixed in one place. This fixing configuration becomes realizable as a result of the hydraulic unit 100 being reduced in size in the direction of the first direction D1 because of the above configuration. According to this configuration, the configuration of the hydraulic unit 100 can be made even simpler and more compact.

In the hydraulic unit 100, the dispositions of the constituent elements of the hydraulic unit 100 are not limited to the above example and can be appropriately set. For example, the inlet valve mounting port 51 and the pressure reducing valve mounting port 52 may also be formed on the side of the main housing 20. According to this also, air inside the inlet valve 35 and the pressure reducing valve 37 can be easily guided to the outside when filling the hydraulic circuit 30 with the brake fluid. Furthermore, some of the constituent elements of the hydraulic unit 100 housed inside the main housing 20 may also be mounted outside the main housing 20.

Figure 5:
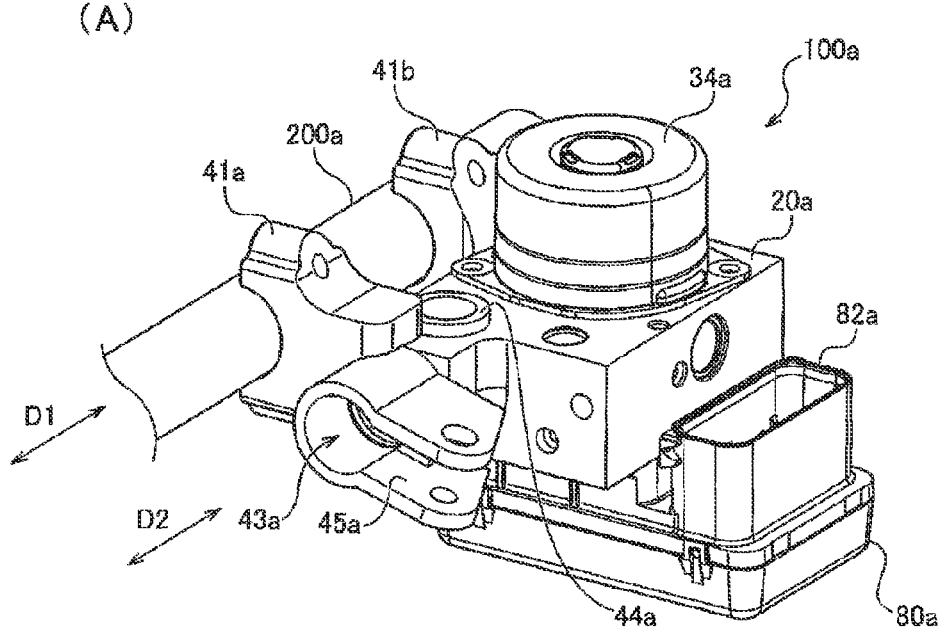
FIG. 5 is explanatory views showing an ABS hydraulic unit serving as a comparative example.
Figure 5:
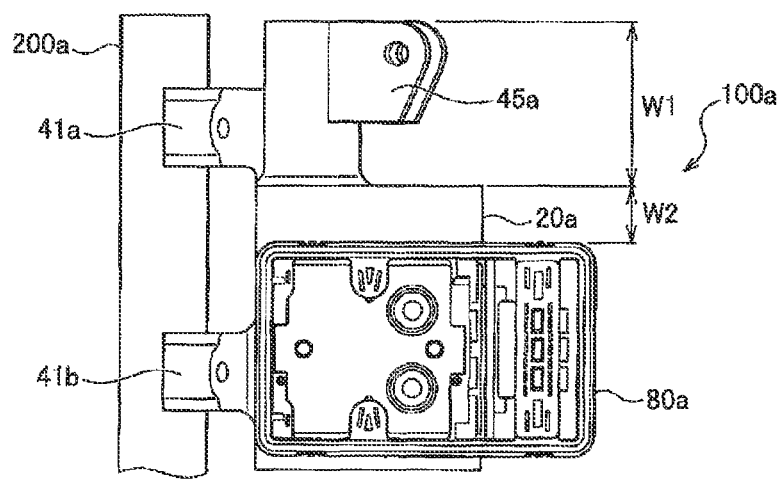

FIG. 5 shows the configuration of a hydraulic unit 100a attached to a handlebar 200a serving as a comparative example. FIG. 5(A) shows a state in which the hydraulic unit 100a is seen from the upper side and the front side of the motorcycle. FIG. 5(B) shows a state in which the hydraulic unit 100a is seen from directly below. In FIG. 5, an "a" or a "b" is added to the ends of the reference signs that were assigned to the constituent elements of the hydraulic unit 100 serving as the working example and correspond to the constituent elements of the hydraulic unit 100a. Only those things about the hydraulic unit 100a that are different from the hydraulic unit 100 will be described below.

As shown in FIG. 5(A) and FIG. 5(B), the hydraulic unit 100a is configured in such a way that the second direction D2, which is the direction in which the piston insertion hole 43a for inserting the piston portion of the master cylinder extends, is parallel to the first direction D1, which is the direction in which the handlebar 200a extends. The reservoir connection port 44a is formed in the upper surface of the main housing 20a due to restrictions stemming from the second direction D2. Furthermore, the main housing 20a is equipped with two attachment portions 41a and 41b that are adjacent to one another and spaced apart from one another in the first direction D1. In FIG. 5(A), one bracket each is mounted to each of the attachment portions 41a and 41b. FIG. 5(A) shows a connector casing 82a, in which terminals of the power supply connector 81 are disposed, instead of the power supply connector 81.

As shown in FIG. 5(B), W1 denotes the width, in the first direction D1, of a section projecting in the first direction D1 from the main housing 20a in order to ensure the range of motion of the piston portion of the master cylinder. Furthermore, W2 denotes the width, in the first direction D1, of a section in which the main housing 20a—excluding the aforementioned projecting section—sticks out from the ECU 80a. The width W2 becomes necessary because of the disposition of the reservoir connection port 44a.

According to the hydraulic unit 100 of the present working example described above, the second direction D2 is set to a direction intersecting the first direction D1, so the width W1 can be made smaller than in the hydraulic unit 100a. Furthermore, the reservoir connection port 44 is disposed on the side of the main housing 20, so space corresponding to the width W2 becomes unnecessary. In this way, the width of the hydraulic unit 100 in the first direction D1 can be made smaller.

Furthermore, the hydraulic unit 100a requires the two attachment portions 41a and 41b in order to stably fix the hydraulic unit 100a to the handlebar 200, because the width of the hydraulic unit 100a in the first direction D1 is large. In contrast, the hydraulic unit 100 of the present working example can be fixed to the handlebar 200 by the one attachment portion 41 because the width of the hydraulic unit 100 in the first direction D1 is small.

B. Modifications

B-1. Modification 1

The configuration of the attachment portion 41 is not limited to the configuration having the groove portion 41g, and the attachment portion 41 can be given a variety of configurations having at least part of the side surface of the through hole for attaching the hydraulic unit 100 to the handlebar 200. For example, the attachment portion 41 may also be configured to have the entire side surface of the through hole. In this case, the attachment portion 41 may also be equipped with an opening and closing mechanism for opening and closing the side surface of the through hole and a fixing mechanism for fixing the opening and closing mechanism in a closed state. The opening and closing mechanism may, for example, be a hinge. The fixing mechanism may, for example, be a bolt.

B-2. Modification 2

The hydraulic unit 100 is not limited to performing antilock brake control in regard to the front wheel of the motorcycle and is widely applicable to a variety of vehicles whose brakes are controlled by a brake lever. For example, in a case where the brake of a rear wheel of a motorcycle is controlled by a brake lever, the hydraulic unit 100 may perform antilock brake control in regard to the rear wheel.

While an embodiment of the present invention has been described above on the basis of several working examples, the embodiment of the invention described above is intended to facilitate understanding of the present invention and is not intended to limit the present invention. The present invention can be altered and improved without departing from the spirit and claims thereof, and equivalents of the present invention are of course included within the present invention. Furthermore, appropriate combinations or omissions are possible to the extent that they address the problem and achieve at least some of the effects described above.

REFERENCE SIGNS LIST

- 20 Main Housing
- 21 To 26 Conduits
- 30 Hydraulic Circuit
- 31 Master Cylinder
- 32 Reservoir Tank
- 33 Hydraulic Pump
- 34 Motor
- 35 Inlet Valve
- 36 Accumulator
- 37 Pressure Reducing Valve
- 41 Attachment Portion
- 41g Groove Portion
- 42 Snap Ring Attachment Hole
- 43 Piston Insertion Hole
- 44 Reservoir Connection Port
- 45 Mounting Portion
- 46 Accumulator-Use Opening
- 47 Wheel Cylinder Connection Port
- 48 Motor Mounting Port
- 49 Pump Mounting Port
- 51 Inlet Valve Mounting Port
- 52 Pressure Reducing Valve Mounting Port
- 60 Brake Lever
- 70 Bracket
- 80 Ecu
- 81 Power Supply Connector
- 82 Connector Casing
- 100 Abs Hydraulic Unit
- 200 Handlebar
- 210 Grip
- 230 Front Wheel Brake
- 240 Wheel Cylinder
- 250 Front Wheel
- D1 First Direction
- D2 Second Direction

What is claimed is:

1. An ABS hydraulic unit for performing antilock brake control of a motorcycle, the ABS hydraulic unit comprising:
   a main housing that has at least part of a hydraulic circuit for controlling a pressure of brake fluid formed inside and is equipped with a mounting portion for mounting a brake lever of the motorcycle and an attachment portion having at least part of a side surface of a through hole formed along a first direction, the through hole being configured to attach the ABS hydraulic unit to a handlebar of the motorcycle;
   a master cylinder that has a piston portion that moves in conjunction with the brake lever, the master cylinder being configured to increase, with the movement of the piston portion, the pressure of the brake fluid inside the hydraulic circuit,
   a motor that drives a hydraulic pump which is a component of the hydraulic circuit; and
   a reservoir tank connected to the master cylinder;
   wherein a piston insertion hole extending in a moving direction of the piston portion is formed in the main housing along a second direction that intersects the first direction, wherein the second direction is not orthogonal to the first direction, wherein a reservoir connection port is disposed along a side of the main housing, wherein the reservoir tank is coupled to the reservoir connection port such that the reservoir tank is disposed adjacent to the motor, and wherein the reservoir tank is configured to be disposed between the brake lever and a grip of the handle bar when the ABS hydraulic unit has been attached to the handlebar.

2. The ABS hydraulic unit according to claim 1, wherein an inside hydraulic circuit of the hydraulic circuit that is formed inside the main housing includes a control valve for performing the antilock brake control, and
   the control valve is disposed on a direction-of-gravity lower side or a side of the main housing in a state in which the ABS hydraulic unit is attached to the handlebar.

3. The ABS hydraulic unit according to claim 1, further comprising
   an ECU that controls the actions of the ABS hydraulic unit and is mounted to the main housing, and
   a power supply connector that is connected to the ECU and is configured to connect to a power supply for the ECU,
   wherein the power supply connector is disposed on a side opposite the mounting portion in the first direction.

4. The ABS hydraulic unit according to claim 1, wherein a connection port for connecting to the reservoir tank is formed in a side of the main housing in a state in which the ABS hydraulic unit is attached to the handlebar, and
   the reservoir tank is disposed on a side of the mounting portion in the first direction relative to the main housing.

5. The ABS hydraulic unit according to claim 1, wherein the attachment portion is equipped with a groove portion formed along the first direction as the side surface of the through hole, and
   the through hole is formed by mounting a bracket separate from the main housing in a position opposing the groove portion of the attachment portion.

6. The ABS hydraulic unit according to claim 1, further comprising the brake lever mounted to the mounting portion.

7. The ABS hydraulic unit according to claim 1, further comprising
- an ECU that controls the actions of the ABS hydraulic unit and is mounted to the main housing, and
- a power supply connector that is connected to the ECU and is configured to connect to a power supply for the ECU,
- wherein the power supply connector is disposed on a side opposite the mounting portion in the first direction.

8. The ABS hydraulic unit according to claim 1, further comprising the handlebar and the brake lever, wherein the reservoir tank is disposed between the grip of the handlebar and the brake lever.

9. The ABS hydraulic unit according to claim 1, further comprising an electronic control unit coupled to a first surface of the main housing, wherein the motor is coupled to a second, opposite surface of the main housing.

10. The ABS hydraulic unit according to claim 1, wherein the reservoir tank is disposed adjacent to the motor on an upper side of the ABS hydraulic unit, wherein the upper side of the ABS hydraulic unit is a side that generally faces vertically upwards during use of the motorcycle.

* * * * *